(12) United States Patent
Takahashi et al.

(10) Patent No.: US 11,117,559 B2
(45) Date of Patent: Sep. 14, 2021

(54) VEHICLE MOVEMENT CONTROL DEVICE, VEHICLE MOVEMENT CONTROL METHOD, AND VEHICLE MOVEMENT CONTROL PROGRAM

(71) Applicant: Hitachi Automotive Systems, Ltd., Hitachinaka (JP)

(72) Inventors: Junya Takahashi, Tokyo (JP); Yuki Akiyama, Tokyo (JP); Masamichi Imamura, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 294 days.

(21) Appl. No.: 16/340,819

(22) PCT Filed: Aug. 22, 2017

(86) PCT No.: PCT/JP2017/029967
§ 371 (c)(1),
(2) Date: Apr. 10, 2019

(87) PCT Pub. No.: WO2018/074048
PCT Pub. Date: Apr. 26, 2018

(65) Prior Publication Data
US 2019/0263368 A1 Aug. 29, 2019

(30) Foreign Application Priority Data
Oct. 19, 2016 (JP) .............................. JP2016-205312

(51) Int. Cl.
*B60W 30/045* (2012.01)
*B60T 8/1755* (2006.01)
(Continued)

(52) U.S. Cl.
CPC ............ *B60T 8/17554* (2013.01); *B60T 7/12* (2013.01); *B60T 8/17* (2013.01); *B60T 8/171* (2013.01);
(Continued)

(58) Field of Classification Search
CPC .......... B60T 8/17554; B60T 7/12; B60T 8/17; B60T 8/171; B60T 8/17551;
(Continued)

(56) References Cited

U.S. PATENT DOCUMENTS

2005/0165550 A1* 7/2005 Okada .................... G08G 1/166
701/301
2008/0319617 A1 12/2008 Takemura
(Continued)

FOREIGN PATENT DOCUMENTS

EP  2 050 642 A2  4/2009
EP  2 712 780 A1  4/2014
(Continued)

OTHER PUBLICATIONS

Extended European Search Report issued in European Application No. 17863128.9 dated Apr. 22, 2020 (eight (8) pages).
(Continued)

*Primary Examiner* — Genna M Mott
(74) *Attorney, Agent, or Firm* — Crowell & Moring LLP

(57) ABSTRACT

An object of the invention is to realize an M+ control which is suitable to a driving scene without depending on pedal operation information of a driver. A vehicle motion control device according to the invention sets an absolute value of deceleration generated in the vehicle in a period in which the lateral motion of the vehicle is predicted to be changed from a state where the vehicle takes the lateral motion to a state where the vehicle does not take the lateral motion to be smaller than that generated in a period in which the lateral
(Continued)

motion of the vehicle is predicted to be changed from a state the vehicle takes one of right and left lateral motions to a state where the vehicle takes the other lateral motion.

11 Claims, 8 Drawing Sheets

(51) Int. Cl.
| | |
|---|---|
| *B60T 7/12* | (2006.01) |
| *B60T 8/17* | (2006.01) |
| *B60T 8/171* | (2006.01) |
| *B60T 8/24* | (2006.01) |
| *B60T 8/32* | (2006.01) |
| *B60W 10/04* | (2006.01) |
| *B60W 10/184* | (2012.01) |
| *B60W 30/04* | (2006.01) |
| *B60W 30/10* | (2006.01) |
| *B62D 6/08* | (2006.01) |

(52) U.S. Cl.
CPC ........ *B60T 8/1755* (2013.01); *B60T 8/17551* (2013.01); *B60T 8/17555* (2013.01); *B60T 8/243* (2013.01); *B60T 8/321* (2013.01); *B60W 10/04* (2013.01); *B60W 10/184* (2013.01); *B60W 30/04* (2013.01); *B60W 30/045* (2013.01); *B60W 30/10* (2013.01); *B62D 6/08* (2013.01); *B60T 2240/00* (2013.01); *B60T 2250/04* (2013.01); *B60T 2260/09* (2013.01); *B60T 2270/30* (2013.01); *B60W 2030/043* (2013.01); *B60W 2510/20* (2013.01); *B60W 2520/06* (2013.01); *B60W 2520/10* (2013.01); *B60W 2520/125* (2013.01); *B60W 2520/26* (2013.01); *B60W 2710/09* (2013.01); *B60W 2710/18* (2013.01); *B60W 2720/106* (2013.01); *B60W 2720/14* (2013.01); *B60Y 2300/022* (2013.01)

(58) Field of Classification Search
CPC ...... B60T 8/17555; B60T 8/243; B60T 8/321; B60T 2240/00; B60T 2250/04; B60T 2260/09; B60T 2270/30; B60T 8/1755; B60W 10/04; B60W 10/184; B60W 30/04; B60W 30/045; B60W 2030/043; B60W 2510/20; B60W 2520/06; B60W 2520/10; B60W 2520/125; B60W 2520/26; B60W 2710/09; B60W 2710/18; B60W 2720/106; B60W 2720/14; B60Y 2300/022

See application file for complete search history.

(56) References Cited

U.S. PATENT DOCUMENTS

| | | | |
|---|---|---|---|
| 2012/0179349 | A1 | 7/2012 | Yamakado et al. |
| 2014/0136015 | A1* | 5/2014 | Hayakawa .......... B60T 8/17557 701/1 |
| 2014/0200780 | A1* | 7/2014 | Watanabe .......... B60T 8/17554 701/68 |
| 2015/0094927 | A1* | 4/2015 | Takahashi .......... B60W 30/025 701/93 |
| 2015/0239442 | A1* | 8/2015 | Yamakado ................ B60L 7/18 701/70 |
| 2017/0183000 | A1 | 6/2017 | Yamakado et al. |

FOREIGN PATENT DOCUMENTS

| | | |
|---|---|---|
| EP | 2 905 193 A1 | 8/2015 |
| JP | 6-336163 A | 12/1994 |
| JP | 2005-170152 A | 6/2005 |
| JP | 2008-143231 A | 6/2008 |
| JP | 2010-260544 A | 11/2010 |
| JP | 2011-73534 A | 4/2011 |
| JP | 2012-66777 A | 4/2012 |
| JP | 2014-69766 A | 4/2014 |

OTHER PUBLICATIONS

International Search Report (PCT/ISA/210) issued in PCT Application No. PCT/JP2017/029967 dated Oct. 31, 2017 with English translation (four (4) pages).
Japanese-language Written Opinion (PCT/ISA/237) issued in PCT Application No. PCT/JP2017/029967 dated Oct. 31, 2017 (seven (7) pages).
Japanese-language Office Action issued in Japanese Application No. 2016-205312 dated Apr. 22, 2020 with English translation (12 pages).

* cited by examiner

FIG. 9

| DRIVING SCENE | | | CONTROL AMOUNT | |
|---|---|---|---|---|
| ABSOLUTE VALUE OF LATERAL ACCELERATION | SIDESLIP | TURNING STATE | G-Vectoring CONTROL | M+CONTROL |
| INCREASE | SMALL | - | LARGE | SMALL OR ZERO |
| INCREASE | LARGE | - | SMALL OR ZERO | SMALL OR ZERO |
| DECREASE | SMALL | CONTINUOUS TURNING | SMALL OR ZERO | LARGE |
| DECREASE | SMALL | TURNING ESCAPE | LARGE | SMALL OR ZERO |
| DECREASE | LARGE | CONTINUOUS TURNING | SMALL OR ZERO | LARGE |
| DECREASE | LARGE | TURNING ESCAPE | SMALL OR ZERO | LARGE |

FIG. 10

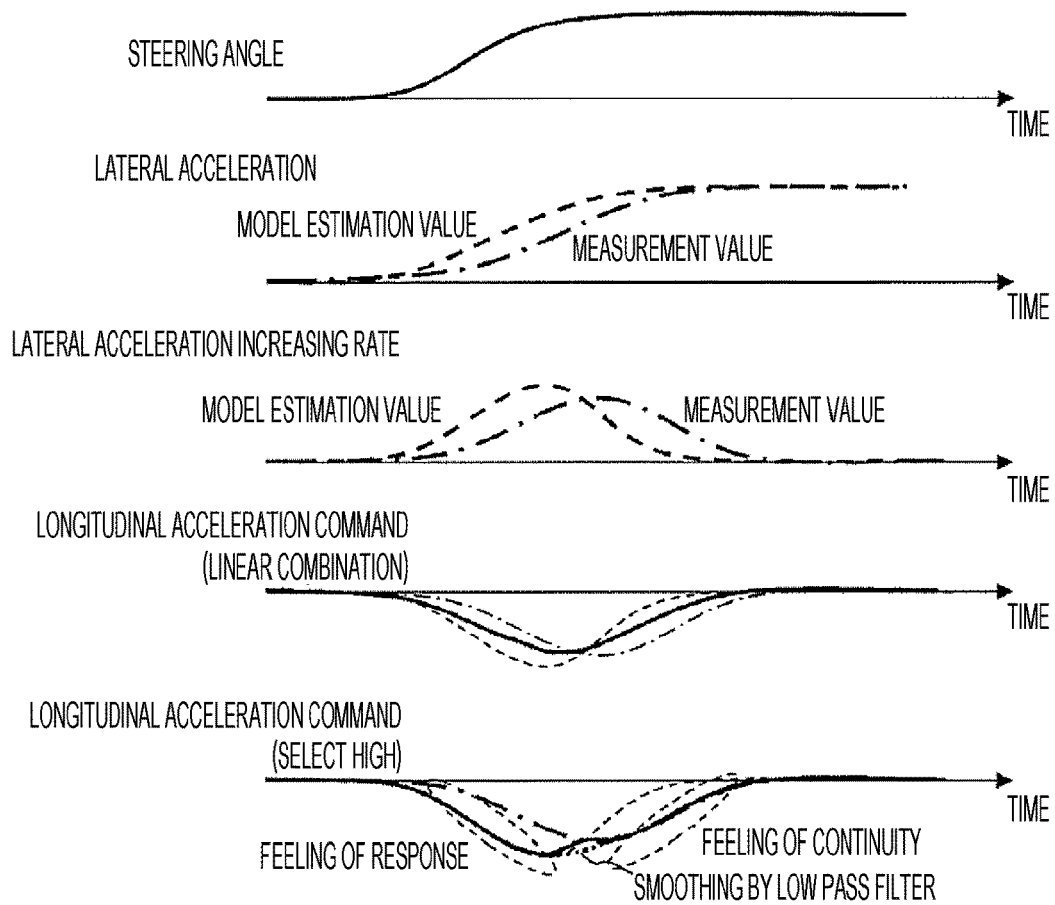

VEHICLE MOVEMENT CONTROL DEVICE, VEHICLE MOVEMENT CONTROL METHOD, AND VEHICLE MOVEMENT CONTROL PROGRAM

TECHNICAL FIELD

The invention relates to a technology of controlling a motion of a vehicle.

BACKGROUND ART

In recent years, as a technique for improving the stability of vehicles, an electronic stability control (hereinafter, referred to as ESC) is widely used to prevent spinning and off-course during making a turn. The ESC is a vehicle motion control based on an idea of Direct Yaw-moment Control (hereinafter, referred to as DYC). The DYC is a control method to improve controllability and stability of the vehicle, in which a yawing moment prompting or recovering a yawing motion which is a rotation about a Z axis of the vehicle is controlled by making different between braking forces and driving forces in the right and left wheels.

PTL 1 discloses a method of automatically accelerating or decelerating in association with the lateral motion caused by a steering wheel operation to shift a load between a front wheel and a rear wheel so as to improve controllability and stability of the vehicle. In this document, there is disclosed a motion control method of the vehicle in which a predetermined gain determined from a speed (V) and a lateral acceleration (Gy) is multiplied to an input acceleration increasing rate (Gy_dot) in a horizontal direction of the vehicle, generates a control command to control a longitudinal acceleration of the vehicle on the basis of the multiplied value, and outputs the generated control command (see Abstract). According to this method, the locus of a resultant acceleration vector (G) of the longitudinal acceleration and the lateral acceleration is smoothly curved in a coordinate system in which the gravity center of the vehicle is fixed (Vectoring). Therefore, the control is called a G-Vectoring control. According to the G-Vectoring control, it is reported that an urgent avoidance performance is significantly improved.

PTL 2 discloses a technique in which an acceleration/deceleration control (the G-Vectoring control) based on a lateral acceleration increasing rate and a YAW moment control (ESC) based on sideslip information are combined to prevent the off-course and the spinning.

Further, PTL 3 discloses an additional YAW moment control (Moment Plus; hereinafter referred to as M+ control) in which the control is shifted from a linear region to link the G-Vectoring control and the ESC.

In order to realize a motion control (a hybrid control of the G-Vectoring and the ESC (DYC)) of the vehicle in which controllability and stability are achieved as well as riding quality, there is no way to incorporate the motion control to the ESC. With technique disclosed in PTL 3, the YAW moment control (M+ control) is added as a transfer of both controls, so that the G-Vectoring and the M+ control can be mounted to the controller connected through communication for example, and a command can be sent to the ESC through communication so as to realize Hybrid+ control. This indicates that the technique and the device can be provided to many drivers in an embodiment where a plurality of hardware.

CITATION LIST

Patent Literature

PTL 1: JP 2010-260544 A
PTL 2: JP 2011-73534 A
PTL 3: JP 2014-69766 A

SUMMARY OF INVENTION

Technical Problem

In a case where the M+ control is realized using an ESC braking actuator, different braking forces are generated for the right and left wheels of the vehicle according to the lateral acceleration increasing rate. Then, the YAW moment prompting the YAW motion of the vehicle or the YAW moment stabilizing the YAW motion of the vehicle is generated. In the configuration of such actuator, the YAW moment control of the M+ control may cause deceleration in either case where the YAW motion of the vehicle is prompted or stabilized. In this case, particularly in a scene when the driver expects acceleration when escaping a curve, the deceleration generated by the M+ control may cause an uncomfortable feeling. Thus, in PTL 3, a control gain of the M+ control is changed according to an accelerator pedal operation of the driver. Therefore, the YAW moment control such as the deceleration of the M+ control is suppressed on a condition that the driver steps on the accelerator.

However, in the above method, it is not possible to detect a driver's intention because no pedal operation occurs during an acceleration/deceleration assistant system such as an adaptive cruise control (ACC) is used or in a case where the driver does not the accelerator pedal operation such as an automatic driving. There is a possibility that a driver's unintended deceleration occurs by the M+ control.

The invention has been made in view of these problems, and an object thereof is to realize the M+ control suitable to a driving scene without depending on pedal operation information of the driver.

Solution to Problem

A vehicle motion control device according to the invention sets an absolute value of deceleration generated in the vehicle in a period in which the lateral motion of the vehicle is predicted to be changed from a state where the vehicle takes the lateral motion to a state where the vehicle does not take the lateral motion to be smaller than that generated in a period in which the lateral motion of the vehicle is predicted to be changed from a state the vehicle takes one of right and left lateral motions to a state where the vehicle takes the other lateral motion.

Advantageous Effects of Invention

According to a vehicle motion control device of the invention, it is possible to relieve an uncomfortable feeling caused by a driver's unintended deceleration suppression without depending on an accelerator pedal operation of the driver. The YAW motion can be stabilized.

BRIEF DESCRIPTION OF DRAWINGS

FIG. 9 is a table illustrating a control amount of the M+ control and a control amount of the G-Vectoring control at each driving scene.

FIG. 10 is a diagram for describing a method of calculating a control command value using an estimation value which is estimated using a vehicle motion model.

DESCRIPTION OF EMBODIMENTS

Figure 1:
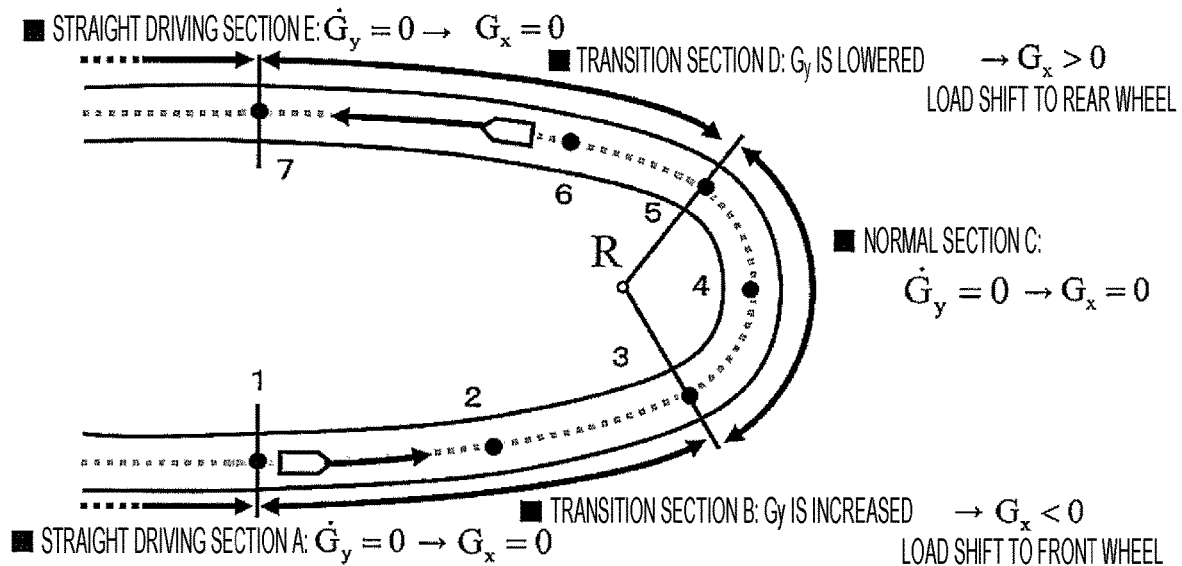
FIG. 1 is a diagram for describing a specific driving example to which a G-Vectoring control is applied.
Figure 1:
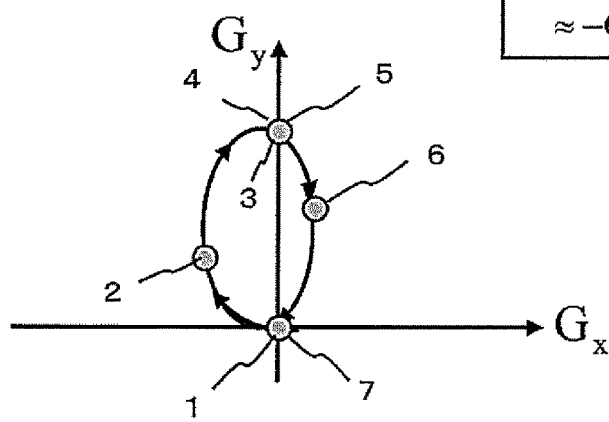

Hereinbelow, before describing embodiments of a vehicle motion control device according to the invention, the description will be given about the outlines of a longitudinal motion control (the G-Vectoring control) and a YAW moment control (M+ control) associated with a lateral motion, and a combination thereof in order to help with understanding on the invention. In the following description, in a case where a gravity center point of a vehicle is set to an original point, a longitudinal direction of the vehicle is set to x, and a direction perpendicular to the longitudinal direction (the lateral (right and left) direction of the vehicle) is set to y, the acceleration in the x direction is a longitudinal acceleration, and the acceleration in the y direction is a lateral acceleration. The forward acceleration is positive, that is, the longitudinal acceleration which increases the speed when the vehicle is proceeding in the forward direction is positive. The lateral acceleration which is generated when the vehicle is proceeding in the forward direction and turns left (counterclockwise) is positive, and is negative in the opposite direction. A left-turning radius is set to be positive, and the reciprocal number thereof is set to a vehicle running curvature. Similarly, a target trajectory also has a left turning radius as positive, and the reciprocal number thereof is set to a target trajectory curvature. In addition, a steering angle in the left turning (counterclockwise) direction is set as positive.

(1) Longitudinal Motion Control Associated with Lateral Motion: G-Vectoring

The G-Vectoring is a method of automatically accelerating or decelerating in association with the lateral motion caused by a steering wheel operation to shift a load between a front wheel and a rear wheel so as to improve controllability and stability of the vehicle. As described in the following Formula 1, an acceleration/deceleration command value (longitudinal acceleration command value Gxc) is a value basically obtained by multiplying the lateral acceleration increasing rate Gy_dot by a gain Cxy with a primary delay. In Formula 1, Gy represents a lateral acceleration of the vehicle, Gy_dot represents a lateral acceleration increasing rate of the vehicle, Cxy represents a gain, T represents a primary delay time constant, s represents a Laplacian operator, and Gx_DC represents an acceleration/deceleration degree command having no association with the lateral motion. With the G-Vectoring, a linkage control strategy of lateral and longitudinal motions of an expert driver can be partially simulated. The improvement in controllability and stability of the vehicle can be realized.

[Mathematical Formula 1]

$$G_{xc} = -sgn(G_y \cdot G_{y\_dot}) \frac{C_{xy}}{(1+Ts)} |G_{y\_dot}| + G_{x\_DC} \quad (1)$$

Gx_DC represents a deceleration component (offset) having no association with the lateral motion, and is a term which is required in a case where there is a predictive deceleration for a corner ahead, or in a case where there is an interval speed command. The term sgn (signum) is a term provided to obtain the above operation for both of the right corner and the left corner. Specifically, the vehicle is decelerated at the time of turning when the steering starts. When a normal turning comes, the deceleration is stopped (because the lateral acceleration increasing rate becomes zero). The vehicle is accelerated at the time of getting out of the corner when the steering returns.

If a resultant acceleration (denoted by G) of the longitudinal acceleration and the lateral acceleration is denoted in a diagram in which the horizontal axis represents the longitudinal acceleration and the vertical axis represents the lateral acceleration, the vehicle is shifted in a curve as time goes by in a case where the vehicle is controlled according to Formula 1 (Vectoring). Therefore, this control method is called "the G-Vectoring control".

FIG. 1 is a diagram for describing a specific driving example to which the G-Vectoring control is applied. Herein, it will be assumed a typical driving scene where the vehicle enters a corner and gets out. The driving trajectory illustrated in FIG. 1 includes a straight driving road A, a transition section B, a normal turning section C, a transition section D, and a straight driving section E. In FIG. 1, it is assumed that the driver does not operate the acceleration or deceleration.

Figure 2:
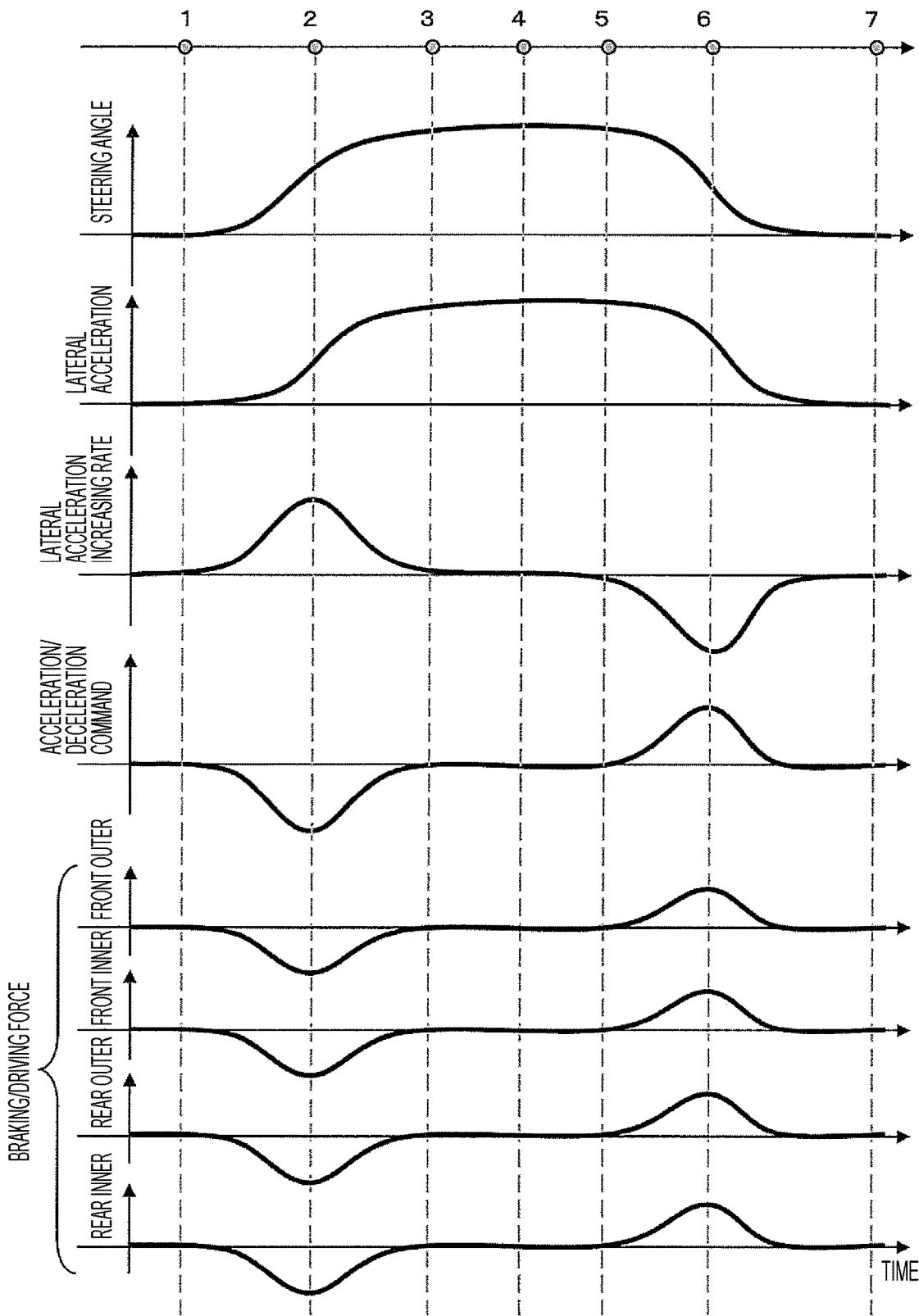
FIG. 2 is a diagram illustrating a time-varying waveform of a steering angle, a lateral acceleration, a lateral acceleration increasing rate, a longitudinal acceleration command calculated using Formula 1, and braking force/driving forces of four wheels.

FIG. 2 is a diagram illustrating a time-varying waveform of the steering angle, the lateral acceleration, the lateral acceleration increasing rate, the longitudinal acceleration command calculated using Formula 1, and braking force/driving forces of the four-wheels. While being described in detail below, the braking force/driving force are distributed to the front outer wheel and the front inner wheel, and the rear outer wheel and the rear inner wheel such that the right and left (inner and outer) values become equal. The braking/driving force is a generic term of a force generating in each wheel in the longitudinal direction of the vehicle. The braking force is defined as a force decelerating the vehicle, and the driving force is defined as a force to accelerate the vehicle. In FIGS. 1 and 2, the lateral acceleration Gy generated when the vehicle turns left is set as positive, and the longitudinal acceleration Gx in the front proceeding direction of the vehicle is set as positive. In addition, in the force generated in each wheel, the driving force is set as positive, and the braking force is set as negative.

First, the vehicle enters a corner from the straight driving road section A. In the transition section B (point 1 to point 3), the lateral acceleration Gy of the vehicle is increased as the driver gradually increases the steering wheel. The lateral acceleration increasing rate Gy_dot becomes a positive value during a period in which the lateral acceleration near point 2 is increased (returning to zero at point 3 where the increase of the lateral acceleration ends). At this time, in the vehicle, the lateral acceleration Gy is increased by Formula 1, and a deceleration command is generated as well (Gxc is negative). At this time, almost the same magnitude of braking force (negative signal) is added to the front outer, front inner, rear outer, and rear inner wheels.

When the vehicle enters the normal turning section C (point 3 to point 5), the driver stops the increasing of the steering, and keeps the steering angle constant. At this time, the lateral acceleration increasing rate Gy_dot becomes 0, and thus the longitudinal acceleration command value Gxc becomes 0. Therefore, the braking force/driving force of each wheel becomes zero.

In the transition section D (points 5 to 7), the lateral acceleration Gy of the vehicle is lowered as the driver turns back the steering. At this time, the lateral acceleration increasing rate Gy_dot of the vehicle becomes negative, and a positive longitudinal acceleration command value Gxc (acceleration command) is generated in the vehicle by Formula 1. At this time, almost the same magnitude of driving force (positive signal) is added to the front outer, front inner, rear outer, and rear inner wheels.

In the straight driving section E, the lateral acceleration increasing rate Gy becomes 0, the lateral acceleration increasing rate Gy_dot also becomes zero. Therefore, the acceleration/deceleration control is not performed.

As described above, the vehicle is decelerated from the time of turning when the steering starts (point 1) up to a clipping point (point 3). The deceleration is stopped during the normal circular turning (point 3 to point 5). The vehicle is accelerated from the time when the steering starts to turn (point 5) until getting out of the corner (point 7). In this way, with the G-Vectoring control in the vehicle, it is possible to realize the acceleration/deceleration motion related to the lateral motion only by the driver's steering to turning the vehicle.

In a diagram ("g-g" diagram) illustrating an acceleration state of the vehicle in FIGS. 1 to 2 in which the horizontal axis represents the longitudinal acceleration and the vertical axis represents the lateral acceleration, the vehicle moves to shift in a smooth curve shape (to draw a circle). An acceleration/deceleration command of the invention is generated to cause a curved shifting as time goes by in the diagram. In the curved shifting, the vehicle is shifted in the clockwise direction at the left corner as illustrated in FIG. 1, and shifted reversely to Gx axis at the right corner in the counterclockwise direction. With such a shifting, a pitching motion generated in the vehicle by the longitudinal acceleration and a roll motion generated by the lateral acceleration are appropriately associated with each other. The peak values of a roll rate and a pitch rate are lowered.

As described in Formula 1, if the primary delay term and the signum function for the right and left motions are omitted in the control, a value obtained by multiplying the lateral acceleration increasing rate of the vehicle by the gain Cxy is set as the longitudinal acceleration command. Therefore, the deceleration or the acceleration can be increased by setting the gain Cxy large even in the case of the same lateral acceleration increasing rate.

Figure 3:
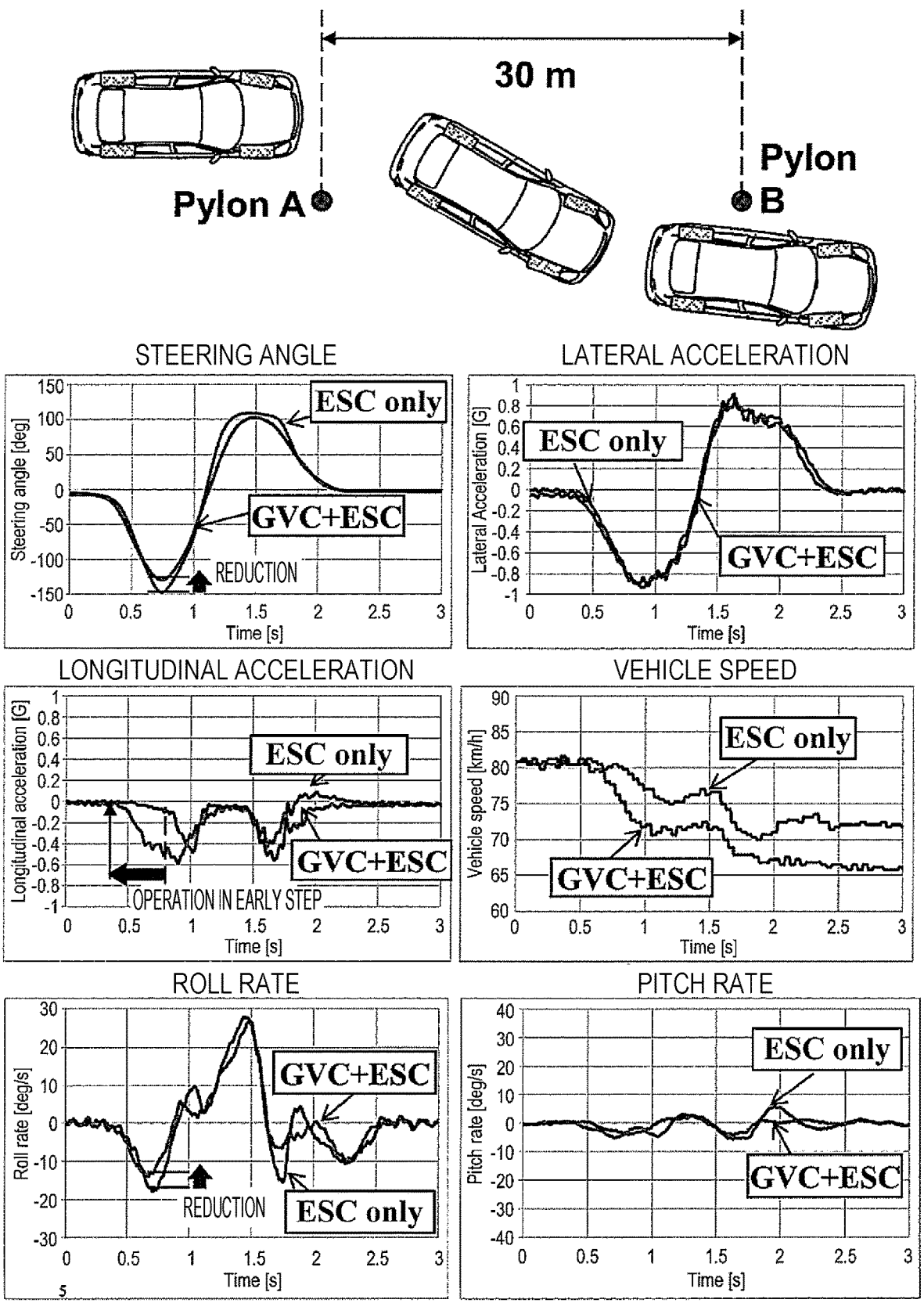
FIG. 3 is a diagram illustrating an effect on lane change when a deceleration is controlled by the G-Vectoring control.

FIG. 3 is a diagram illustrating an effect on lane change when the deceleration is controlled by the G-Vectoring control. In FIG. 3, Pylon A and Pylon B are placed at a distance 30 m therebetween. The vehicle passes through the left side of Pylon A and moves to the right side of Pylon B so as to change lanes. In this case, a case where only the conventional sideslip prevention device (Electronic Stability Control: ESC) operates on the steering angle, the longitudinal acceleration, the lateral acceleration, and the vehicle speed (ESC Only) will be compared to a case where both the G-Vectoring control and the ESC are performed (GVC+ESC).

In a case where only the ESC is performed, a sideslip is detected near a period from 0.75 seconds to 1 second when the steering rapidly returns, and a stabilization moment is added (generation of deceleration). With this regard, in the linkage control of the G-Vectoring control and the ESC, the deceleration starts from a moment when the steering starts, and the speed is lowered by 10 km/h at 0.5 seconds after the steering starts.

With this configuration, the steering angle is small, and the roll rate and the pitch rate are also significantly lowered. It can be seen that the lane change is safely performed. In this way, when the G-Vectoring control is applied, an avoidance performance when avoiding an obstacle by the steering can be significantly improved.

(2) YAW Moment Control Based on G-Vectoring: Moment Plus (M+)

The M+ control is a method of promoting the YAW motion by the acceleration/deceleration of the above-described G-Vectoring control or of achieving the same effect of the stabilization by the difference generated in the braking/driving forces of the right and left wheels of the vehicle so as to promote the YAW motion and improve the stability. A specific target YAW moment Mz_GVC is given as the following Formula 2. Cmn is a proportionality factor, and Tmn is a primary delay time constant.

[Mathematical Formula 2]

$$M_{z\_GVC} = sgn(G_y \cdot G_{y\_dot}) \frac{C_{mn}}{(1 + T_{mn}s)} |G_{y\_dot}| \qquad (2)$$

Figure 4:
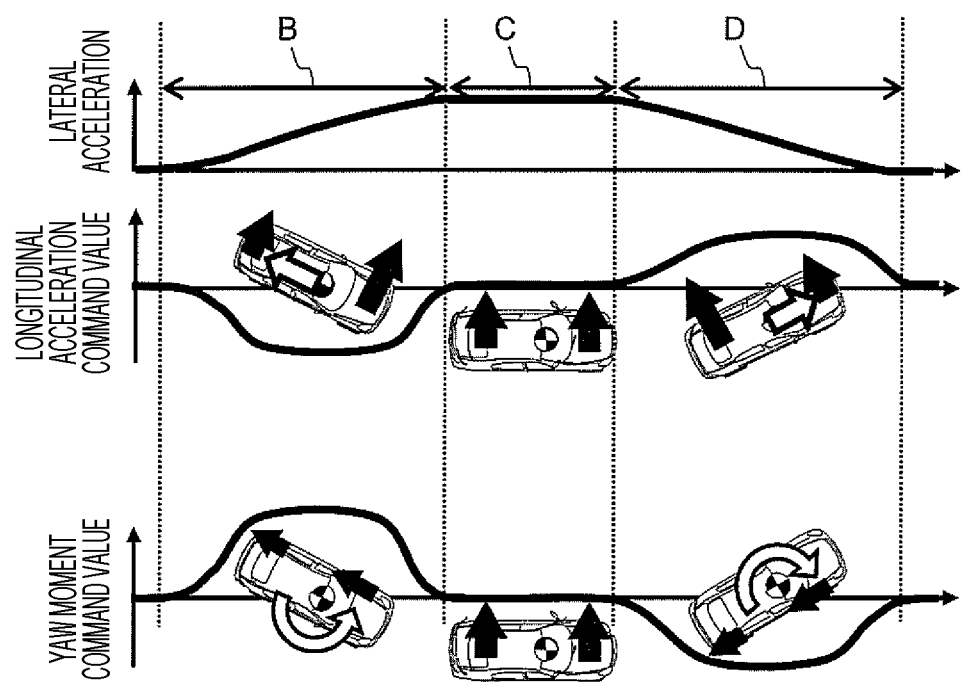
FIG. 4 is a diagram illustrating a relation between an increase/decrease of the lateral acceleration, a longitudinal acceleration command value Gxc of the G-Vectoring control, and a target YAW moment Mz-GVC caused by an M+ control.

FIG. 4 is a diagram illustrating a relation between an increase/decrease of the lateral acceleration, the longitudinal acceleration command value Gxc of the G-Vectoring control, and the target YAW moment Mz-GVC caused by the M+ control. In FIG. 4, the YAW moment of the left turning about the gravity center of the vehicle is positive.

In the section B where the lateral acceleration is increased, the G-Vectoring control generates a negative longitudinal acceleration command value (that is, the vehicle is decelerated), and the YAW motion after the turning starts is promoted by a difference of lateral forces of the front/rear wheels which is caused by the load shift. With this regard, the M+ control directly generates the YAW moment about the gravity center by the difference of the braking/driving forces of the right and left wheels of the vehicle (in FIG. 4, only the left wheel of the vehicle generates the braking force) so as to stabilize the YAW motion.

In the normal turning section C where the lateral motion becomes constant, both command values of the G-Vectoring control and the M+ control become zero. In the section D where the lateral acceleration is decreased, the G-Vectoring control generates a positive longitudinal acceleration command value (that is, the vehicle is accelerated), and the YAW motion after the turning starts is stabilized by a difference of lateral forces of the front/rear wheels which is caused by the load shift. With this regard, the M+ control directly generates the YAW moment about the gravity center by the difference between the braking/driving forces of the right and left wheels of the vehicle (in FIG. 4, only the right wheel of the vehicle generates the braking force) so as to stabilize the YAW motion.

In this way, both the G-Vectoring control and the M+ control promote the YAW motion in the section where an absolute value of lateral acceleration is increased, and generate the longitudinal acceleration command values or the YAW moment commands respectively to stabilize the YAW motion in the section where the absolute value of lateral acceleration is decreased.

(3) Combination of G-Vectoring Control and M+ Control

In a case where the four wheels are independently controlled and driven, the longitudinal acceleration generated by the M+ control is made to be equal to the longitudinal acceleration command value of the G-Vectoring control so as to make the two controls not to interfere to each other. Specifically, the YAW moment generated by a difference between a sum value FwL of the braking/driving force generated in the front/rear wheels on the left and a sum value FwR of the braking/driving force generated in the front/rear wheels on the right becomes a YAW moment command value of the M+ control. FwL and FwR may be determined such that the longitudinal acceleration generated by the sum of FwL and FwR becomes the longitudinal acceleration command value of the G-Vectoring control.

However, in a case where there is a constraint of an actuator available to the control, the longitudinal acceleration generated in the vehicle is changed by the YAW moment control of the M+ control. For example, in a case where only the braking actuator such as the ESC is a controllable actuator, a negative longitudinal acceleration is generated in the vehicle as well when the YAW moment control is performed by the different between the braking forces of the right and left wheels. At this time, in a scene when the YAW motion generated in the vehicle (FIG. 4D), the G-Vectoring control generates a positive longitudinal acceleration (that is, the vehicle is accelerated), and the M+ control generates a negative longitudinal acceleration (that is, the vehicle is decelerated) in the vehicle using only the braking force. In such a driving scene, in a case where the driver sets importance on acceleration rather than stabilization in the YAW motion, uncomfortable feeling of the driver caused by the deceleration generated by the M+ control is highly likely to be set importance on rather than the effect of stabilization of the YAW motion by the M+ control.

Then, in PTL 3, the deceleration of the M+ control is not performed according to the accelerator pedal operation of the driver. However, in a case where an automatic acceleration/deceleration function such as ACC or an automatic driving function is used, it is not always necessary for the driver to operate the accelerator pedal. Therefore, the M+ control is necessarily adjusted without depending on the accelerator pedal operation of the driver.

In the invention of the following, the description will be given about a method of adjusting a YAW moment control amount when the M+ control is applied in the driving scene (FIG. 4D) in which the YAW motion is stabilized. In the invention, as the adjusting method of the M+ control according to the driving scene, the lateral motion of the vehicle is predicted and the longitudinal acceleration generated by the M+ control is adjusted on the basis of the predicted lateral motion of the vehicle. As a specific method of predicting the lateral motion of the vehicle, any well-known technique may be used, and an example thereof will be described below.

Figure 5:
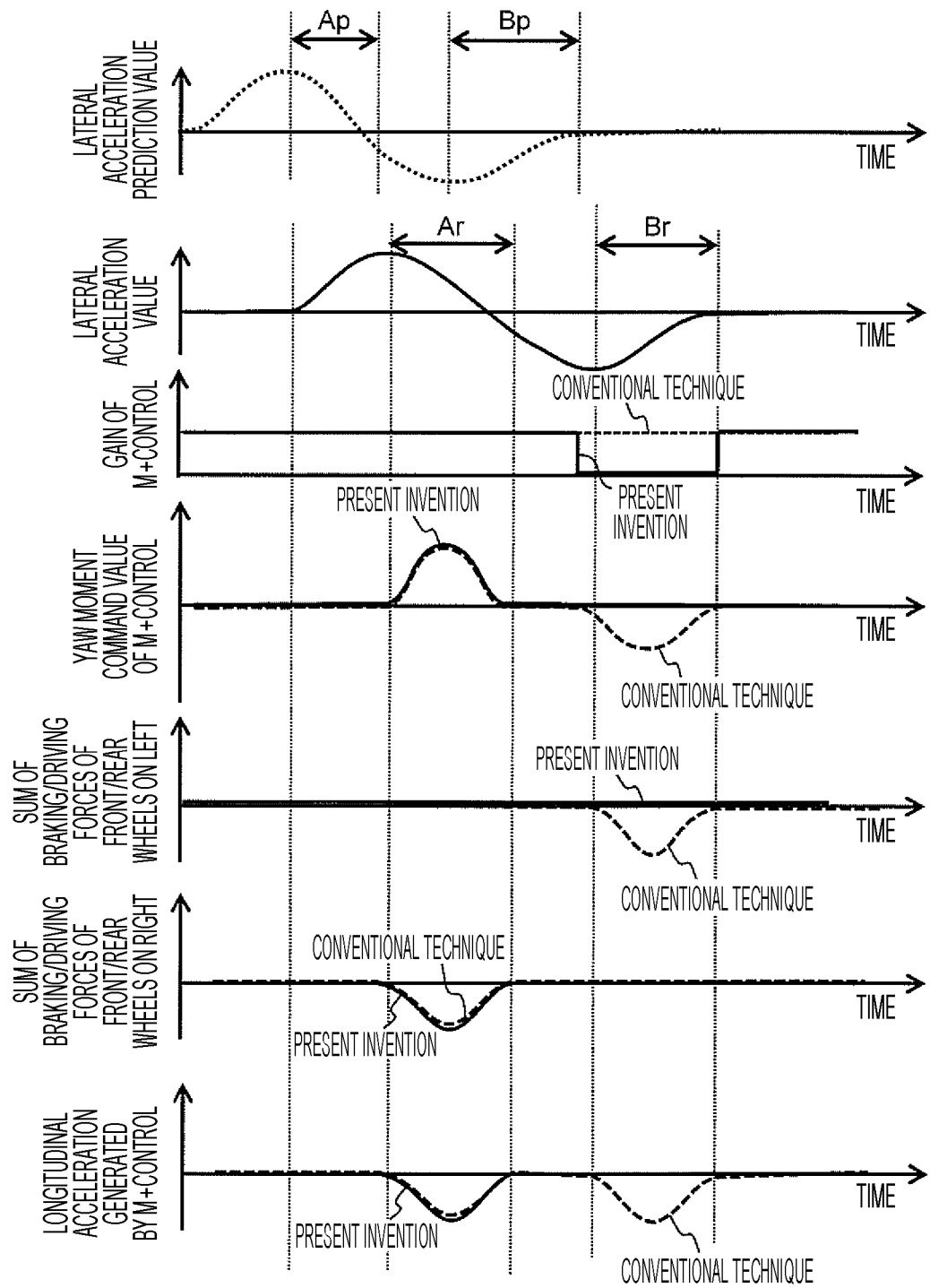
FIG. 5 is a graph illustrating a change with time of parameters in a case where a vehicle goes straight on after turning to right and left.

FIG. 5 is a graph illustrating a change with time of parameters in a case where the vehicle goes straight after turning to right and left. In a case where it is predicted that the state is continuously changed from a state where the lateral acceleration operates toward any one of the right and left directions to a state where the lateral acceleration operates toward the other direction (Ap in FIG. 5), a braking force control amount of the M+ control becomes large during a period of the continuous change from the state where the lateral acceleration (a value of the lateral acceleration) actually generating in the vehicle operates toward any one of the right and left directions to the state where the lateral acceleration operates toward the other direction (Ar in FIG. 5). On the contrary, in a case where it is predicted that the state is continuously changed from the state where the lateral acceleration operates toward any one of the right and left directions to a state where the lateral acceleration is not generated (Bp in FIG. 5), the braking force control amount of the M+ control becomes small during a period of the change from the state where the value of the lateral acceleration operates toward any one of the right and left directions to the state where the lateral acceleration is not generated (Br in FIG. 5).

For example, in a case where the control amount is adjusted according to the gain of the M+ control, the control gain is constant in any section in the conventional technique (the broken line in the drawing). However, in the invention, the gain of the M+ control in the period Br is made smaller than that in the period Ar. With this configuration, the braking force of each wheel caused by the YAW moment command value of the M+ control in the period Br is made small (the sum of the braking/driving forces of the front/rear wheels in FIG. 5). Therefore, the negative longitudinal acceleration (deceleration) generated by the M+ control in the period Br can be suppressed more than the deceleration generated in the section Ar.

As described above, in a driving scene (period Ar in FIG. 5) of the steering (so called a switching steering) where the lateral motion is continuously changed from the left direction to the right direction (or vice versa) such as the lane change or the S curve driving, a vehicle motion control device 1 according to the invention performs the YAW moment control by M+ with priority higher than the stabilization of the YAW motion even in the case of the actuator configuration where the deceleration is generated by the M+ control. On the other hand, in a driving scene (period Br in FIG. 5) where the vehicle shifts from a turning state (a state where the lateral acceleration of a predetermined value or more is generated in any one of the right and left directions) to a straight driving state (a state where the lateral acceleration is almost zero) or a semi-straight driving state (a normal turning state where the lateral acceleration is significantly small), the deceleration generated by the M+ control is suppressed with priority rather than the stabilization of the YAW motion. With this configuration, even in a case where the deceleration is generated by the YAW moment control of the M+ control caused by the constraint of the actuator configuration, the YAW moment control of the M+ control is suppressed in the driving scene where the vehicle shifts from the turning to the straight driving. Therefore, the deceleration of the vehicle is suppressed, and the uncomfortable feeling of the driver can be relieved.

Figure 6:
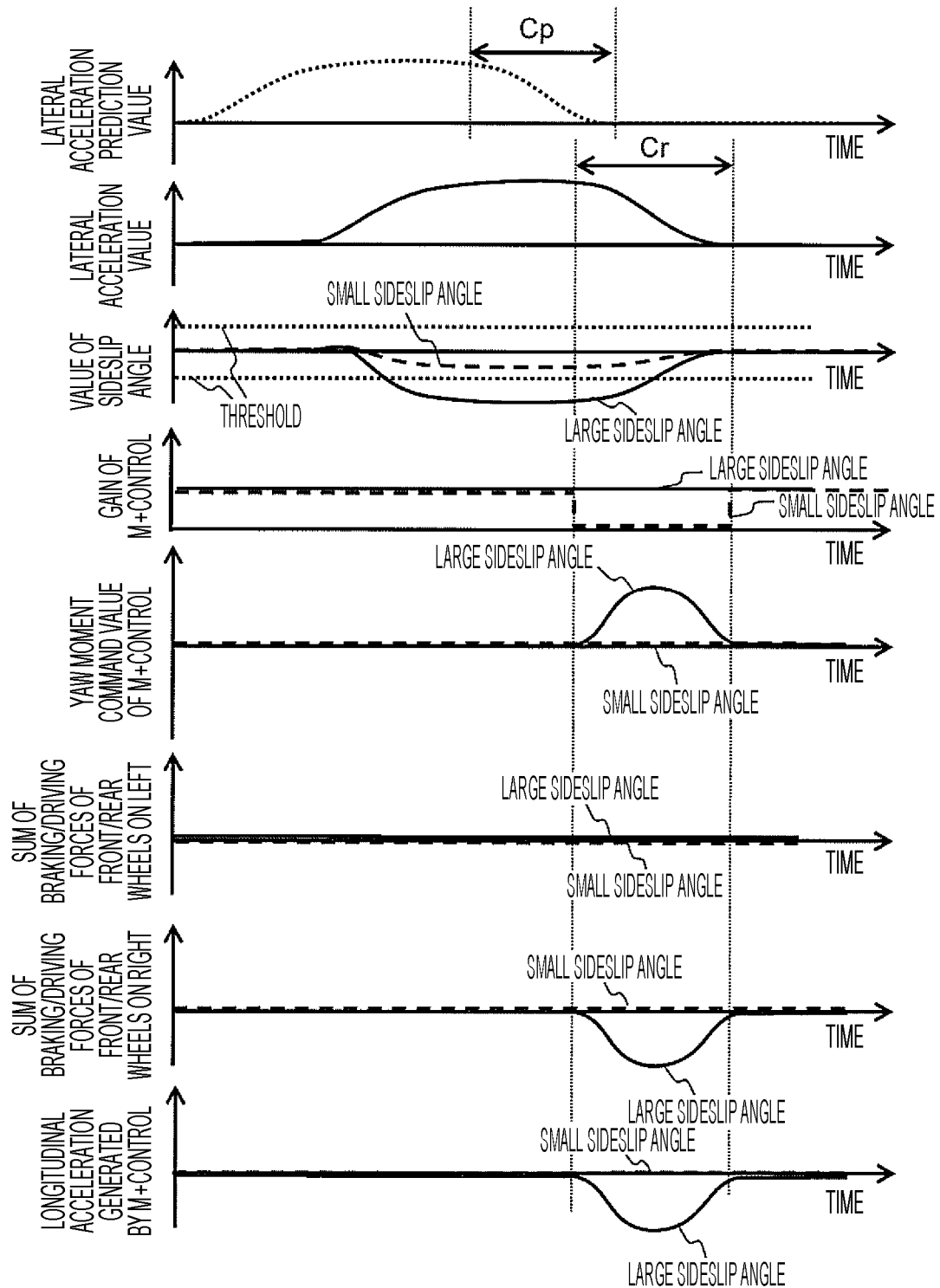
FIG. 6 is a graph illustrating a change with time of parameters in a case where a sideslip of the vehicle is large.

FIG. 6 is a graph illustrating a change with time of parameters in a case where a sideslip of the vehicle is large. In the invention, even in the driving scene where the lateral acceleration generated in the vehicle is changed from the turning state to the straight driving state, the YAW moment control amount of the M+ control is made large to achieve the stabilization of the vehicle as long as the sideslip of the vehicle is large.

The description will be given about an example that the vehicle motion control device 1 uses a sideslip angle as an index to detect a sideslip state. As illustrated in FIG. 6, in a case where an absolute value of the sideslip angle generated in the vehicle is larger than a predetermined value (threshold) set in advance (large sideslip angle in FIG. 6), the braking force generated in each wheel by the YAW moment command value of the M+ control is adjusted to be larger than that in a case where the sideslip angle is smaller than the predetermined value (small sideslip angel in FIG. 6). With this configuration, even in the driving scene where the vehicle shifts from the turning state to the straight driving state as in the period Cr of FIG. 6, the YAW motion can be stabilized by the M+ control as long as the sideslip angle of the vehicle is large. Similarly, the amount of the M+ control may be set large even in the continuously turning state as long as the sideslip angle of the vehicle is large.

Figure 7:
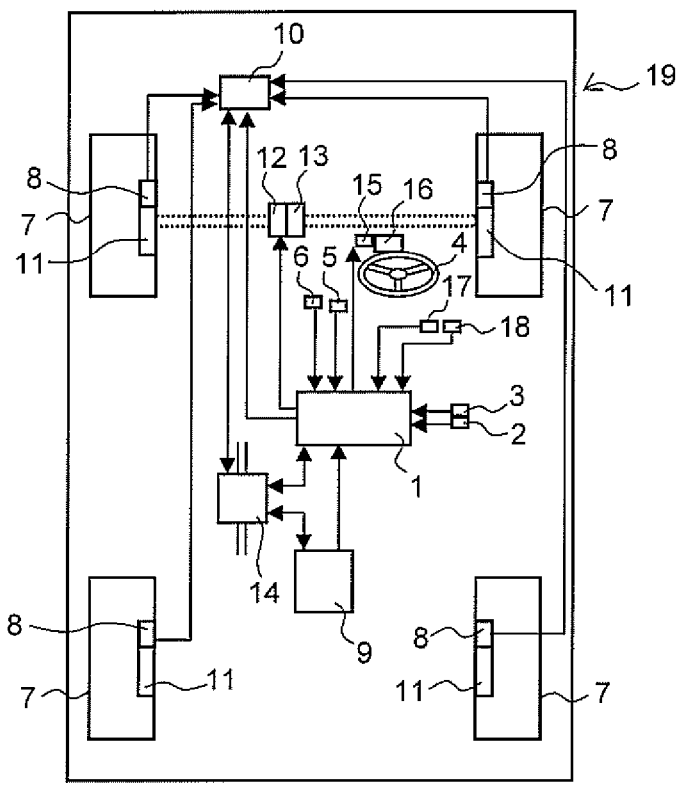
FIG. 7 is a diagram illustrating a configuration of a vehicle 19 with a vehicle motion control device 1 mounted therein according to an embodiment of the invention.

FIG. 7 is a diagram illustrating a configuration of a vehicle 19 with the vehicle motion control device 1 mounted therein according to an embodiment of the invention. The vehicle motion control device 1 includes sensors (an acceleration sensor 2, a gyro sensor 3, and the wheel speed sensor 8) to acquire the vehicle motion state information, sensors (a steering angle sensor 5, a brake pedal sensor 17, and an accelerator pedal sensor 18) to acquire driver operation information, and various types of control units.

A driving trajectory generation unit 6 generates subject vehicle target driving trajectory information, and transmits the information to other units. A braking control unit 10 and a driving torque control unit 12 predict the lateral motion of the subject vehicle on the basis of the information obtained from a subject vehicle position detection sensor 9, driving track information stored in the vehicle motion control device 1, or both information, and control driving of the actuation (a braking actuator 11 and a driving actuator 13) which controls the braking/driving force generated in a tire 7 on the basis of the calculation result. A steering angle control unit 15 transmits the command value to a steering angle control actuator 16 to control the steering operation. The control units communicate with each other through a communication line 14.

The vehicle motion control device 1 includes a calculation device which has a storage region, a calculation processing function, and a signal input/output interface. The calculation device calculates the longitudinal acceleration command value generated in the vehicle on the basis of vehicle motion state information, driver operation information, and obstacle information, and transmits the longitudinal acceleration command value to the driving controller of the acceleration/deceleration actuator to generate the longitudinal acceleration to be matched with the command value. Similarly, the calculation device calculates the YAW moment command value, and transmits the YAW moment command value to the driving controller of a DYC actuator to generate the YAW moment.

Figure 8:
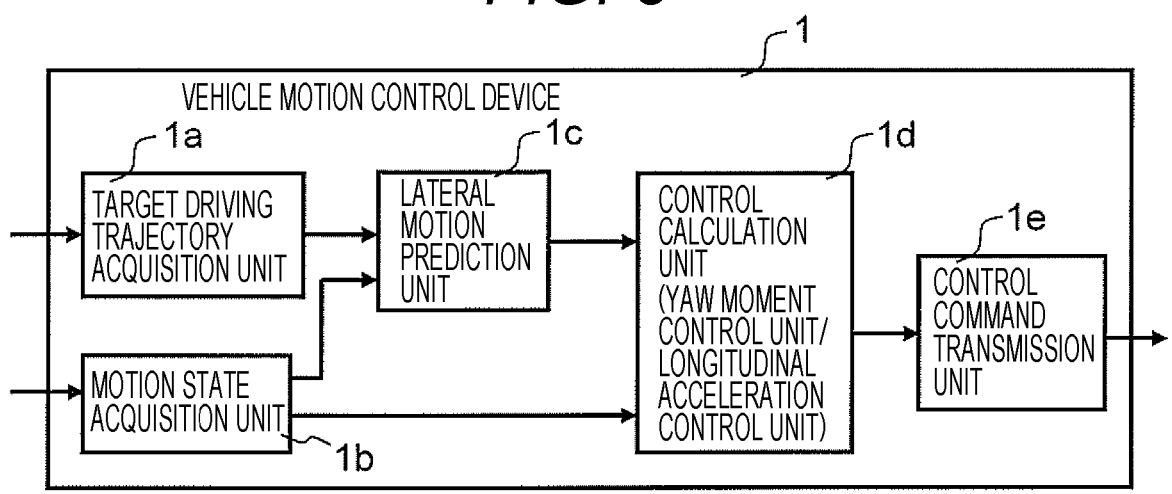
FIG. 8 is a diagram illustrating a configuration of the vehicle motion control device 1.

FIG. 8 is a diagram illustrating a configuration of the vehicle motion control device 1. The vehicle motion control device 1 includes a target driving trajectory acquisition unit 1a, a motion state acquisition unit 1b, a lateral motion prediction unit 1c, a control calculation unit 1d, and a control command transmission unit 1e.

The target driving trajectory acquisition unit 1a acquires a target driving trajectory of the vehicle. The motion state acquisition unit 1b acquires a motion state amount (driving speed, turning state, and driver operation amount) of the vehicle from the vehicle motion state information acquired by the sensor. Specifically, a lateral acceleration Gy and a lateral acceleration increasing rate Gy_dot which are required for calculating the YAW moment command value of the M+ control of Formula 2, a vehicle speed V, and a sideslip angle β are acquired.

The control calculation unit 1d predicts the lateral motion of the vehicle on the basis of information acquired by the target driving trajectory acquisition unit 1a and the motion state acquisition unit 1b. There is no need to predict all the lateral acceleration, the YAW rate, the lateral speed, but any value may be employed as long as the value can be used to predict whether the state where the lateral motion of the vehicle is generated in any one of the right and left directions is continuously shifted to the state in which the lateral motion of the vehicle is generated in the other of the right and left directions (hereinafter, referring to as continuous turning), or whether the state in which the lateral motion of the vehicle is generated in any one of the right and left directions is shifted to the state in which the lateral motion of the vehicle is not generated (hereinafter, referred to as turning escape).

The control calculation unit 1d calculates the YAW moment command value of the M+ control on the basis of Formula 2 using a vehicle motion state amount acquired by the motion state acquisition unit 1b and the lateral motion prediction value acquired by the lateral motion prediction unit 1c, and sends the value to the control command transmission unit 1e. In addition, the longitudinal acceleration command value of the G-Vectoring control is calculated on the basis of Formula 1, and sends the value to the control command transmission unit 1e. The control command transmission unit 1e transmits the YAW moment command value to the driving controller of the DYC actuator, and transmits the longitudinal acceleration command value to the driving controller of the acceleration/deceleration actuator.

FIG. 9 is a table illustrating a control amount of the M+ control and a control amount of the G-Vectoring control at each driving scene. As described above, the YAW moment control amount of the M+ control is changed on the basis of the sideslip state and the driving state (continuous turning and turning escape). Similarly, the control amount of the longitudinal acceleration of the G-Vectoring control may be changed on the basis of the sideslip state and the driving state (the continuous turning, the turning escape). Hereinafter, an installation example will be described according to FIG. 9.

A period where an absolute value of lateral acceleration operating on the vehicle 19 is increased is a driving scene where the vehicle 19 is turning to any one of the right and left directions. At this time, the controllability is improved by the G-Vectoring control. Therefore, the control amount of the G-Vectoring control is relatively increased, and the control amount of the M+ control is relatively decreased. For example, such a section corresponds to the section before the section Ar, and the section between the periods Ar and Br of FIG. 5. However, in a case where the sideslip of the vehicle 19 is large (for example, the sideslip exceeds a predetermined sideslip threshold), the turning operation of the vehicle 19 is already performed. Therefore, there is no need to support the turning operation by the G-Vectoring control. Therefore, in this case, the control amount of the G-Vectoring control is decreased compared to a case where the sideslip is small.

The period where an absolute value of lateral acceleration operating on the vehicle 19 is decreased corresponds to the section Ar or Br of FIG. 5. The section where the absolute value of lateral acceleration is decreased and the sideslip of the vehicle 19 is increased corresponds to the period Cr of FIG. 6. The control amounts in these periods have been described already.

FIG. 10 is a diagram for describing a method of calculating a control command value using an estimation value which is estimated using a vehicle motion model. The vehicle motion control device 1 may use an actual measurement value of an inertial sensor as the lateral acceleration or the lateral acceleration increasing rate when calculating the control command value of the G-Vectoring control and the control command value of the M+ control, or may use an estimated value using a vehicle motion model. The vehicle motion model may be described as a correspondence between, for example, a vehicle speed V, a steering angle δ, a YAW rate r, the estimation value of the lateral acceleration estimation value, and an estimation value of the lateral acceleration increasing rate. As a specific example, the technique disclosed in PTL 3 may be employed.

The acceleration increasing rate can be obtained at an earlier point of time by using the vehicle motion model. With this configuration, the control can start in an early step. A feeling of response to the steering and a responsibility of the YAW motion with respect to the steering can be improved by the load shift to the front wheel by deceleration. In addition, with the vehicle motion model, it is possible to implement a deceleration control in cooperation with the vehicle lateral motion which is generated in delay after stopping the steering. With this configuration, a feeling of continuity can be obtained without abruptly ending the control. Different control gains may be used for the estimation value used in the vehicle motion model and the measurement value. For example, an extremely small control gain of the measurement value may be used for the control gain of the estimation value, so that the control responsibility to the steering can be given priority rather than the actual behavior.

<Conclusions of Invention>

The vehicle motion control device 1 according to the invention suppresses the control amount of the M+ control in the driving scene of the turning escape on the basis of the lateral motion of the vehicle 19 which is predicted by the lateral motion prediction unit 1c. With this configuration, even in a state where the driver does not operate the accelerator pedal, the M+ control decelerates the vehicle 19 at the time of the turning escape so as to suppress an uncomfortable feeling of the driver. Further, even in the driving scene of the turning escape, in a case where the sideslip of the vehicle 19 is large, the braking/driving force of each wheel is controlled such that the YAW moment generated by the M+ control is increased compared to a case where the sideslip is small. With this configuration, it is possible to stabilize the YAW motion of the vehicle 19.

<Modifications of Invention>

The invention is not limited to the above embodiments, but various modifications may be contained. For example, the above-described embodiments of the invention have been described in detail in a clearly understandable way, and are not necessarily limited to those having all the described configurations.

For example, the control gain may be changed in order to adjust the control amount of the G-Vectoring control and the control amount of the M+ control. Otherwise, for example, at least one of an upper limit and a lower limit is provided with respect to the braking force of the M+ control. The control amount may be adjusted by changing the upper/lower limits according to the driving scene. Specifically, the upper/lower limits may be changed such that a maximum braking force generated in each wheel by the M+ control in the period Br of FIG. 5 becomes smaller than that in the section Ar. Otherwise, the upper/lower limits may be set to the YAW moment command value created by the M+ control.

In the invention, the ratio of the braking/driving force between the front/rear wheels may be arbitrarily distributed as long as the difference of the braking/driving force between the right and left wheels is generated. For example, the ratio may be set as Front wheel 2:Rear wheel 1, Front wheel 1:Rear wheel 1, and Front wheel 1:Rear wheel 0. Otherwise, the braking/driving force may be distributed in proportion to a maximum tire force (friction limit) of each wheel.

As a method for the lateral motion prediction unit 1c to predict the lateral motion of the vehicle 19, for example, a target trajectory or a target lateral motion is acquired from a separate controller (for example, an automatic driving ECU), and the lateral motion (for example, the lateral acceleration) of the vehicle 19 can be predicted using the acquired value and the present vehicle motion information (the vehicle speed, the YAW rate, the longitudinal acceleration, the lateral acceleration, etc.). Otherwise, the target lateral motion of the subject vehicle is created from a detection result of an external recognition sensor (a global positioning system, an image recognition sensor, a laser sensor, etc.) and the vehicle motion information, and the lateral motion can be predicted from the target lateral motion. Making an explanation simple, the lateral motion can be predicted from the vehicle speed and the steering angle without using the external recognition sensor. In this case, it is considered that the prediction range is shortened compared to the method of acquiring the target trajectory or the target lateral motion from a separate controller, or the method of using the external recognition sensor. On the other hand, there is no need of the separate controller to create the target trajectory and the external recognition sensor. Therefore, the configuration of the vehicle motion control device 1 can be simplified.

As a sensor to acquire the vehicle motion information, any sensor may be used as long as the sensor can acquire the vehicle speed, the longitudinal acceleration, the lateral acceleration, and the YAW rate. For example, the vehicle speed may be acquired by differentiating the position information obtained by the global positioning system (GPS). The YAW rate, the longitudinal acceleration, and the lateral acceleration of the vehicle may be acquired using an image acquisition sensor such as a camera. There is no need to directly input a detection result of the sensor to the vehicle motion control device 1. For example, the necessary information may be acquired through the communication line 14 from a separate unit (for example, a braking control unit 10). The other sensors are also the same.

As a sensor to acquire the driver operation information, any sensor may be used as long as the sensor acquires a driver's operation amount of a steering wheel 4 and a driver's operation amount of the brake pedal and the accelerator pedal.

The target driving trajectory information may be acquired by communicating with the driving trajectory generation unit 6 for example. Otherwise, the target driving trajectory information may be generated from the driving track information stored in the vehicle motion control device 1 using the global positioning system (GPS) as the subject vehicle position detection sensor 9. Instead of these sensors and units, the target driving trajectory information may be acquired using a vehicle-to-vehicle communication or a road-to-vehicle communication. Without using the driving trajectory generation unit 6 and the subject vehicle position detection sensor 9, the target driving trajectory may be created from the steering angle obtained by the steering angle sensor 5 and the wheel speed sensor 8 and the wheel speed.

Any acceleration/deceleration actuator may be used as long as the actuator controls a force generated between the tire 7 and the road surface to control the longitudinal acceleration generated in the vehicle 19. For example, the following configuration is exemplified. (a) A braking/driving torque applied on the tire 7 is controlled by controlling a state of the combustion engine. (b) The braking/driving torque applied on the tire 7 is controlled by controlling a current of an electric motor. (c) The longitudinal acceleration is controlled by changing a transmission gear ratio when the transmission transfers power to each wheel. (d) The longitudinal acceleration is generated by pushing a brake pad of each wheel to a brake disk.

Any DYC actuator may be used as long as the actuator controls the YAW moment generated in the vehicle 19 by individually controlling the braking/driving forces of the right and left wheels. For example, the following configuration is exemplified. (a) The braking/driving torques applied on the tires 7 of the right wheel and the left wheel are individually controlled by controlling the current of the electric motor. (b) The forces pushing the brake pads to the brake disks of the right and left wheel of the vehicle are individually controlled.

A control signal transmitted to the driving controller of the acceleration/deceleration actuator is not necessarily a longitudinal acceleration, and may be a signal which can realize the longitudinal acceleration command value by the acceleration/deceleration actuator. For example, in a case where the acceleration/deceleration actuator is a combustion engine, a braking/driving torque command value which can realize the longitudinal acceleration command value may be transmitted to the driving torque control unit 12. A driving signal of the combustion engine realizing the longitudinal acceleration command value may be directly transmitted to the control actuator of the combustion engine without through the driving torque control unit 12. In a case where a hydraulic friction brake which hydraulically attaches the brake pad to the brake disk is used, a hydraulic command value realizing the acceleration command value may be transmitted to the braking control unit 10. The driving signal of the driving actuator of the hydraulic friction brake realizing the longitudinal acceleration command value may be directly transmitted to the driving actuator of the hydraulic friction brake without through the braking control unit 10.

The control signal transmitted to the driving controller of the DYC actuator may be not the YAW moment, but may be a signal which can realize the YAW moment command value by the DYC actuator. For example, in a case where the DYC actuator is an electric motor, the braking/driving torque command values of the right and left wheels of the vehicle which can realize the YAW moment command value may be transmitted to the driving torque control unit 12. An electric motor driving signal realizing the YAW moment command value to realize the YAW moment command value may be directly transmitted to the control actuator of the electric motor without through the driving torque control unit 12. In a case where the hydraulic friction brake which hydraulically attaches the brake pad to the brake disk is used, the hydraulic command values of the right and left wheels which can realize the YAW moment command value may be transmitted to the braking control unit 10. The driving signal of the driving actuator of the hydraulic friction brake realizing the YAW moment command value may be directly transmitted to the driving actuator of the hydraulic friction brake without through the braking control unit 10.

When the longitudinal acceleration command value is realized, the acceleration/deceleration actuator which performs the driving control may be changed according to the longitudinal acceleration command value. For example, in a case where the combustion engine and the hydraulic friction brake are used as the acceleration/deceleration actuator, the combustion engine is controlled in driving if the longitudinal acceleration command value falls within a range which can be realized by controlling the braking/driving torque of the combustion engine, and the hydraulic friction brake is controlled in driving together with the combustion engine if the longitudinal acceleration command value is a negative value within a range which cannot be realized by controlling the braking/driving torque of the combustion engine. In the electric motor and the combustion engine are used as the acceleration/deceleration actuator, the electric motor may be controlled in driving if the temporal change of the longitudinal acceleration is large, and the combustion engine may be controlled in driving if the temporal change is small. In normal time, the longitudinal acceleration command value may be controlled in driving by the electric motor. If the electric motor is not able to realize the longitudinal acceleration command due to the state of the battery, other acceleration/deceleration actuator (the combustion engine, the hydraulic friction brake, etc.) may be controlled in driving.

When the YAW moment command value is realized, the DYC actuator which controls the driving according to the YAW moment command value may be changed. For example, in a case where the electric motor and the hydraulic friction brake are used as the DYC actuator, the electric motor may be controlled in driving if the temporal change of the YAW moment command value is large, and the hydraulic friction brake may be controlled if the temporal change is small. In normal time, the YAW moment command value may controlled in driving by the electric motor. If the electric motor is not able to realize the YAW moment command value due to the state of the battery or a command value, the hydraulic friction brake may be controlled in driving.

The control units and the sensors may use different communication lines and different communication protocols according to the signal. For example, the ethernet (registered trademark) may be used when the communication is performed with a sensor acquiring subject vehicle track information which necessarily transfers a large amount of data. Controller Area Network may be used when the communication is performed with the actuator.

The vehicle speed V may be acquired by differentiating the position of the subject vehicle obtained by the subject vehicle position detection sensor 9, or may be acquired from the wheel speed sensor 8. The sideslip angle β may be acquired from a moving direction of the subject vehicle position detection sensor 9 and a vehicle YAW angle, or may be calculated using the vehicle motion model from the vehicle speed V, the steering angle δ, the YAW rate r, and the lateral acceleration Gy. The magnitude of the sideslip of the vehicle 19 may be determined on the basis of the sideslip angle β, and may be determined according to a deviation between a target YAW rate and an actual YAW rate.

In a case where the YAW moment command value illustrated in Formula 2 is adjusted, the YAW moment command value may be adjusted using values such as the braking/driving force of each wheel, the operation amount of the accelerator pedal of the driving, and the operation amount of the brake pedal.

These vehicle motion state amounts may be directly detected by sensors, or may be acquired through communication with other controllers. Further, these vehicle motion state amounts may be estimated by applying the other state values to a vehicle model or a tire model.

The acceleration/deceleration actuator and the DYC actuator may be separate actuators, or may be the same actuator. For example, in a case where the hydraulic friction brake unit which can individually increase or decrease the braking force of each wheel is used jointly with the acceleration/deceleration actuator and the DYC actuator, the longitudinal acceleration command value and the YAW moment command value are transmitted to of the driving controller of the hydraulic friction brake unit. A plurality of actuators may be used as the acceleration/deceleration actuator, and the longitudinal acceleration command value may be transmitted to each of the actuators. A plurality of actuators may be used as the DYC actuator, and the YAW moment command value may be transmitted to each of the actuators.

The above explanation has been given about the configuration that the vehicle motion control device 1 performs both the acceleration/deceleration control of the G-Vectoring control and the YAW moment control of the M+ control. However, the vehicle motion control device 1 performs only the M+ control, and another controller may perform the G-Vectoring control. For example, the G-Vectoring control may be assembled in the driving controller of the acceleration/deceleration actuator. The driving controller may acquire information necessary for the G-Vectoring control, and the acceleration/deceleration control of the G-Vectoring control may be performed. Even in a case where the vehicle motion control device 1 performs only the M+ control, the same effect as that of the invention may be exerted by suppressing the amount of the M+ control at the time of the turning escape.

The vehicle motion control device 1 and the driving controller of the DYC actuator may be mounted as the same controller. In other words, the driving controller of the DYC actuator may include the components illustrated in FIG. 8 to perform the YAW moment control of the M+ control.

In the above explanation, the vehicle motion control device 1 has been described to control the longitudinal acceleration according to the lateral acceleration increasing rate which operates on the vehicle 19. However, similar controls may be performed according to the lateral motion other than the lateral acceleration increasing rate. For example, the similar controls may be performed according to the YAW rate of the vehicle 19 instead of the lateral acceleration increasing rate.

Some of the configurations, the functions, the processing units, and processing devices may be realized in hardware by designing with an integrated circuit for example. In addition, the configurations and the functions may be realized in software such that a processor interprets and performs a program which realizes each function. The information of the program realizing functions, tables, and files may be stored in a recording device such as a memory, a hard disk, a Solid State Drive (SSD) or a recording medium such as an IC card, an SD card, and a DVD.

REFERENCE SIGNS LIST

1 vehicle motion control device
2 acceleration sensor
3 gyro sensor
4 steering wheel
5 steering angle sensor
6 driving trajectory generation unit
7 tire
8 wheel speed sensor
9 subject vehicle position detection sensor
10 braking control unit
11 braking actuator
12 driving torque control unit
13 driving actuator
14 communication line
15 steering angle control unit
16 steering angle control actuator
17 brake pedal sensor
18 accelerator pedal sensor
19 vehicle

The invention claimed is:

1. A vehicle motion control device which controls a motion of a vehicle, comprising:
a target trajectory acquisition unit which acquires a target trajectory of the vehicle;
a lateral motion prediction unit which predicts a lateral motion of the vehicle based on the target trajectory; and
a YAW moment control unit which controls a YAW moment generated in the vehicle by a difference of braking/driving forces of right and left wheels of the vehicle according to the lateral motion of the vehicle,
wherein the YAW moment control unit controls the YAW moment generated in the vehicle in a first period predicted by the lateral motion prediction unit when the lateral motion of the vehicle is changed from a state where the vehicle exhibits one of right and left lateral motions to a state where the vehicle exhibits the other lateral motion, and
the YAW moment control unit sets an absolute value of deceleration generated in the vehicle in a second period predicted by the lateral motion prediction unit to be smaller than an absolute value of deceleration generated in the vehicle in the first period when the lateral motion of the vehicle is changed from a state where the vehicle exhibits the lateral motion to a state where the vehicle does not exhibit the lateral motion, wherein
the vehicle motion control device further includes a longitudinal acceleration control unit which controls a longitudinal acceleration of the vehicle according to the lateral motion generated in the vehicle, and
the longitudinal acceleration control unit controls the longitudinal acceleration operating on the vehicle in a third period in which an absolute value of lateral acceleration operating on the vehicle is increased and a degree of sideslip angle of the vehicle is less than a sideslip angle threshold, and in a fourth period in which the absolute value of lateral acceleration operating on the vehicle is increased and the degree of the sideslip angle of the vehicle is equal to or more than the sideslip angle threshold, the longitudinal acceleration control unit sets an absolute value of longitudinal acceleration operating on the vehicle to be smaller than an absolute value of longitudinal acceleration generated in the vehicle in the third period.

2. The vehicle motion control device according to claim 1,
wherein the vehicle motion control device includes a sideslip acquisition unit which acquires the degree of the sideslip angle of the vehicle, and
the YAW moment control unit sets the YAW moment generated in the vehicle to be larger in a case where the degree of the sideslip angle of the vehicle is equal to or more than the sideslip angle threshold in the second period than that in a case where the degree of the sideslip angle of the vehicle is less than the sideslip angle threshold.

3. The vehicle motion control device according to claim 2,
wherein the YAW moment control unit calculates a target YAW rate of the vehicle on the basis of a steering angle of the vehicle and a speed of the vehicle, and
the sideslip acquisition unit determines a magnitude of the sideslip angle of the vehicle on the basis of at least one of a sideslip angle of the vehicle and a difference between the target YAW rate and an actual YAW rate generated in the vehicle.

4. The vehicle motion control device according to claim 1,
wherein the YAW moment control unit controls the YAW moment generated in the vehicle to suppress a YAW motion of the vehicle during a period predicted by the lateral motion prediction unit when the lateral motion of the vehicle is decreased.

5. The vehicle motion control device according to claim 1,
wherein, when a state where a lateral acceleration of one of the right and left sides of the vehicle operates is shifted to a state where the other lateral acceleration operates in the first period, the lateral motion prediction unit predicts that the lateral motion of the vehicle is changed from the state where the vehicle takes one of the right and left lateral motions to the state where the vehicle takes the other lateral motion, and
when a state where the lateral acceleration operates on the vehicle is shifted to a state where the lateral acceleration does not operate in the second period, the lateral motion prediction unit predicts that the lateral motion of the vehicle is changed from the state where the vehicle takes the lateral motion to the state where the vehicle does not take the lateral motion.

6. The vehicle motion control device according to claim 1,
wherein, when a state where a steering angle of the vehicle causes the vehicle to turn to one of right and left directions is shifted to a state where the vehicle is turned to the other direction in the first period, the lateral motion prediction unit predicts that the lateral motion of the vehicle is changed from the state where the vehicle takes one of the right and left lateral motions to the state where the vehicle takes the other lateral motion, and when the state where the steering angle of the vehicle causes the vehicle to turn to one of the right and left directions is shifted to the state where the vehicle is not turned in the second period, the lateral motion prediction unit predicts that the lateral motion of the vehicle is changed from the state where the vehicle takes the lateral motion to the state where the vehicle does not take the lateral motion.

7. The vehicle motion control device according to claim 1,
wherein, in the second period, the longitudinal acceleration control unit sets an absolute value of longitudinal acceleration operating on the vehicle to be larger than an absolute value of longitudinal acceleration generated in the vehicle in the first period.

8. The vehicle motion control device according to claim 1,
wherein the vehicle motion control device includes a sideslip acquisition unit which acquires the degree of sideslip angle of the vehicle, and
the longitudinal acceleration control unit sets an absolute value of longitudinal acceleration generated in the vehicle to be smaller in a case where the degree of the sideslip angle of the vehicle is equal to or more than the sideslip angle threshold in the second period than that in a case where the degree of the sideslip angle of the vehicle is less than the sideslip angle threshold.

9. The vehicle motion control device according to claim 1,
wherein the target trajectory acquisition unit calculates the target trajectory on the basis of a steering angle of the vehicle or a steering angle of a tire, and a speed of the vehicle.

10. The vehicle motion control device according to claim 1,
wherein the target trajectory acquisition unit acquires the target trajectory from another control device of the vehicle.

11. A non-transitory computer-readable storage medium storing instructions, which when when executed by a vehicle motion control device execute a vehicle motion control program, which causes the vehicle motion control device to:
acquire a target trajectory of the vehicle;
predict a lateral motion of the vehicle on the basis of the target trajectory;
calculate a control command value to control a YAW moment generated in the vehicle by a difference of braking/driving forces of right and left wheels of the vehicle according to the lateral motion of the vehicle; and
transmit the control command value to an actuator which controls the YAW moment generated in the vehicle, wherein
in the calculating of the control command value, the vehicle motion control device calculates the control command value in a first period predicted in the predicting of the lateral motion when the lateral motion of the vehicle is changed from a state where the vehicle exhibits one of right and left lateral motions to a state where the vehicle exhibits the other lateral motion,
in the controlling of the YAW moment, the vehicle motion control device calculates the control command value so that an absolute value of deceleration generated in the vehicle in a second period predicted in the predicting of the lateral motion is set to be smaller than an absolute value of deceleration generated in the vehicle in the first period when the lateral motion of the vehicle is changed from a state where the vehicle exhibits the lateral motion to a state where the vehicle does not exhibit it the lateral motion, the vehicle motion control device further includes a longitudinal acceleration control unit which controls a longitudinal acceleration of the vehicle according to the lateral motion generated in a vehicle, and the longitudinal acceleration control unit controls the longitudinal acceleration operating on the vehicle in a third period in which an absolute value of lateral acceleration operating on the vehicle is increased and a degree of sideslip angle of the vehicle is less than sideslip angle threshold, in a fourth period in which the absolute value of lateral acceleration operating on the vehicle is increased and a degree of the sideslip angle of the vehicle is equal to or more then sideslip angle threshold, the longitudinal acceleration control unit sets an absolute value of longitudinal acceleration operating on the vehicle to be smaller than an absolute value of longitudinal acceleration generated in the vehicle in the third period.

* * * * *